(12) United States Patent
Wan

(10) Patent No.: US 10,939,022 B2
(45) Date of Patent: Mar. 2, 2021

(54) IMAGING CAMERA INCLUDES A GASKET WITH A PROTRUSION RECEIVED IN A RECESS OF A LENS

(71) Applicant: AAC Technologies Pte. Ltd., Singapore (SG)

(72) Inventor: Jia Wan, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/236,315

(22) Filed: Dec. 28, 2018

(65) Prior Publication Data

US 2019/0238730 A1    Aug. 1, 2019

(30) Foreign Application Priority Data

Feb. 1, 2018   (CN) .......................... 20182020306.1

(51) Int. Cl.
*H04N 5/225* (2006.01)
*G02B 1/00* (2006.01)

(52) U.S. Cl.
CPC ............. *H04N 5/2254* (2013.01); *G02B 1/00* (2013.01); *H04N 5/22521* (2018.08)

(58) Field of Classification Search
CPC ..... H04N 5/2254; H04N 5/22521; G02B 1/00
USPC ......................................................... 348/335
See application file for complete search history.

(56) References Cited

U.S. PATENT DOCUMENTS 6,072,634 A * 6/2000 Broome ............. G02B 13/0055
359/637

\* cited by examiner

*Primary Examiner* — Lin Ye
*Assistant Examiner* — Chan T Nguyen
(74) *Attorney, Agent, or Firm* — IPro, PLLC; Na Xu

(57) ABSTRACT

The present application discloses an imaging camera, including: a lens holder with an aperture; a first lens unit, a gasket, and a second lens unit arranged in an order from an object side of the imaging camera to an image side of the imaging camera. The second lens unit includes a main area for imaging, a supporting area extending from an edge of the main area, and a recess formed in an object side surface of the supporting area. The gasket includes a gasket body and a protrusion extending from the gasket body toward the recess, the protrusion being at least partially received in the recess. By virtue of the complementary configuration, the relationship between the second lens unit and the gasket becomes easier.

3 Claims, 1 Drawing Sheet

IMAGING CAMERA INCLUDES A GASKET WITH A PROTRUSION RECEIVED IN A RECESS OF A LENS

FIELD OF THE PRESENT DISCLOSURE

The present disclosure relates to the field of image capturing, and more particularly to an imaging camera for capturing an image.

DESCRIPTION OF RELATED ART

With development of technology, besides digital cameras, more and more portable electronic devices are equipped with image capturing functions. To achieve the image capturing function, a camera module is needed.

Generally, a camera module includes a camera lens for collecting light reflected from an object, a sensor for receiving the light and converting the light to electrical signals, and processor for calculating the signals and outputting digital images.

A related imaging camera generally includes a lens holder and a plurality of lens units accommodated in the lens holder. For positioning the lens holder, the imaging camera further provides a housing for accommodating and fastening the lens holder.

Typically, an imaging camera includes a lens holder, at least two lens units accommodated in the lens holder, a pressing ring located between the lens unit adjacent to the lens holder and the lens holder, and a gasket located between the at least two lens units. The lens units are fixed to the lens holder by adhering the pressing ring to the lens holder. The gasket is used for adjusting the distance between the two at least lens units.

In the related arts, one of the at least two lens units is made of glass. Due to the manufacturing limitations, a lens unit made of glass is not easy to be assembled with other components.

Therefore, it is desired that an improved imaging camera can overcome the disadvantages mentioned above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby are only to explain the disclosure, not intended to limit the disclosure.

Figure 1:
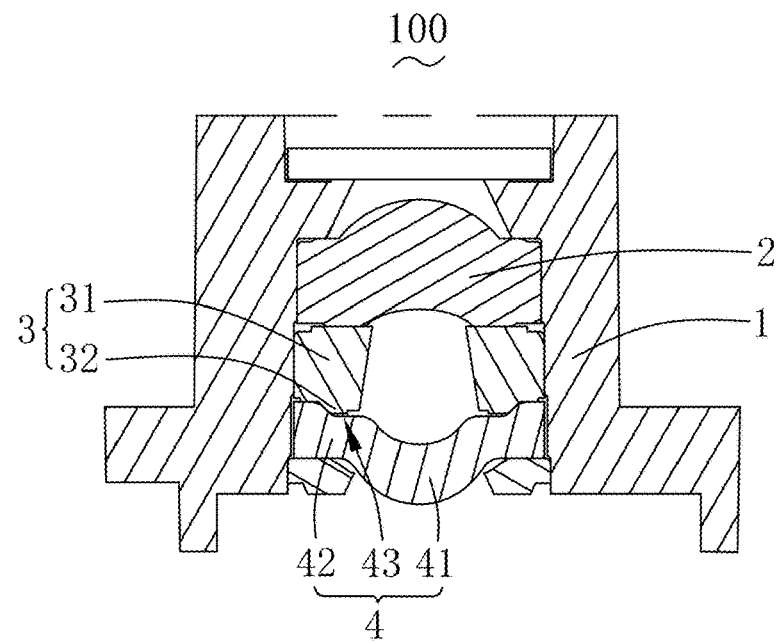
FIG. 1 is an illustration of an imaging camera in accordance with an exemplary embodiment of the present invention.
Figure 2:
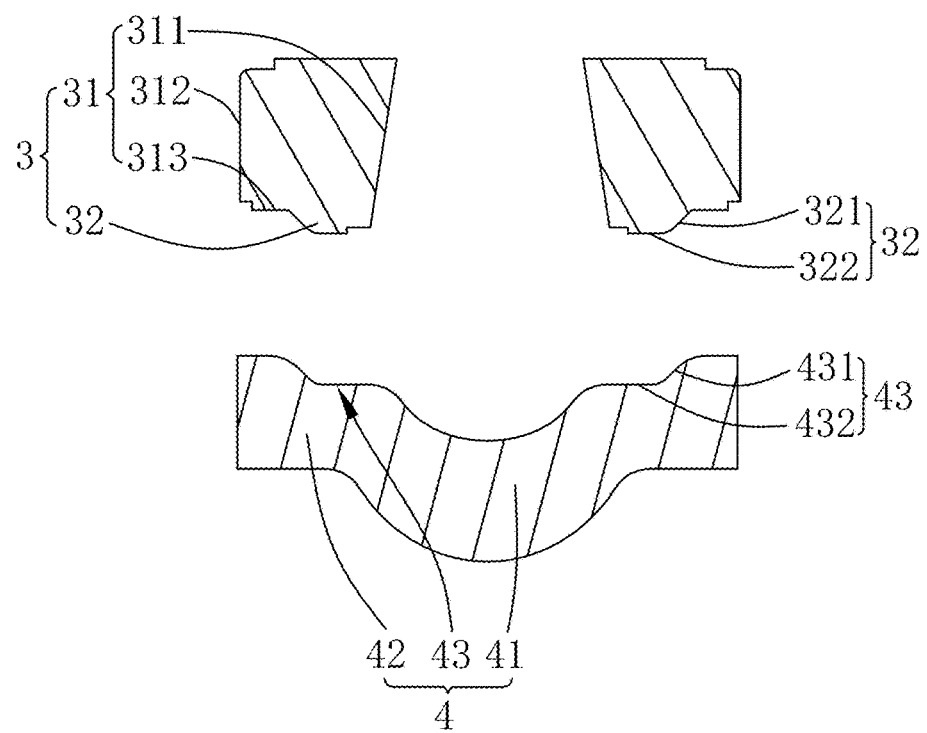
FIG. 2 is an exploded view of the imaging camera in FIG. 1, only showing a gasket and a lens unit.

Referring to FIGS. 1-2, an imaging camera 100 in accordance with an exemplary embodiment of the present invention includes a lens holder 1, a first lens unit 2 accommodated in the lens holder 1, a gasket 3, and a second lens unit 4.

The lens holder 11 includes an aperture for collecting incident light. In an order from an object to an image, the first lens unit 2, the gasket 3 and the second lens unit 4 is arranged in sequence. Only two lens units are presented in this embodiment, however, in fact the amount of the lens units can be adjusted according to actual requirements.

The gasket 3 includes a gasket body 31 and a protrusion 32 extending from the gasket body 31 toward the second lens unit 4. The second lens unit 4 includes a main area 41 for imaging, a supporting area 42 extending from an edge of the main area 41, and a recess 43 formed in an object side surface of the supporting area 42. The protrusion 32 projects toward the recess 43 and is at least partially received in the recess 43 for forming a complementary configuration. In the embodiment, the second lens unit 4 is made of glass. The main body 41 concaves toward the image side. Due to the manufacturing limitation, the main body 41 is not easy to be mounted with the gasket 3. Now, by virtue of the complementary configuration, the relationship between the second lens unit 4 and the gasket 3 become easier.

In detail, the recess 43 includes a first wall 431 extending from an object side surface 421 toward the image side, and a second wall 432 extending from the first wall 431 toward an optical axis. The second wall connects to the object side surface of the main body 41.

The gasket body 31 includes an inner wall 311 adjacent to the optical axis, an outer wall opposite to the inner wall 311, and a bottom wall 313 connecting the inner wall 311 to the outer wall 312. The bottom wall 313 is close to the second lens unit 4.

The protrusion 32 includes a third wall 321 extending from bottom wall 313 toward the recess 43, and a fourth wall 322 extending from the third wall 321 toward the optical axis. The fourth wall 322 connects to the inner wall 311, and the third wall 321 abuts against the first wall 431.

In the embodiment, the first wall 431 is a cambered surface toward the object side, and the third wall 321 is a cambered surface toward the image side. The third wall 321 is a tangent of the first wall 431. Preferably, the second wall 432 is spaced from the fourth wall 322.

Compared with related arts, the protrusion 32 projects toward the recess 43 and is at least partially received in the recess 43 for forming a complementary configuration. In the embodiment, the second lens unit 4 is made of glass. The main body 41 concaves toward the image side. Due to the manufacturing limitation, the main body 41 is not easy to be mounted with the gasket 3. Now, by virtue of the complementary configuration, the relationship between the second lens unit 4 and the gasket 3 becomes easier.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. An imaging camera, including:
a lens holder with an aperture;

a first lens unit, a gasket, and a second lens unit arranged in an order from an object side of the imaging camera to an image side of the imaging camera;

the second lens unit including a main area for imaging, a supporting area extending from an edge of the main area, and a recess formed in an object side surface of the supporting area;

the gasket including a gasket body and a protrusion extending from the gasket body toward the recess, the protrusion being at least partially received in the recess;

wherein the recess includes a first wall extending from an object side surface toward the image side, and a second wall extending from the first wall toward an optical axis, the second wall connects to the object side surface of the main body; the gasket body includes an inner wall adjacent to the optical axis, an outer wall opposite to the inner wall, and a bottom wall connecting the inner wall to the outer wall, the bottom wall is close to the second lens unit; the protrusion includes a third wall extending from bottom wall toward the recess, and a fourth wall extending from the third wall toward the optical axis; the fourth wall connects to the inner wall, and the third wall abuts against the first wall;

wherein the first wall is a cambered surface toward the object side, and the third wall is a cambered surface toward the image side; the third wall is a tangent of the first wall.

2. The imaging camera as described in claim 1, wherein the second lens unit is made of glass.

3. The imaging camera as described in claim 1, wherein the second wall is spaced from the fourth wall.

* * * * *